United States Patent [19]
Ishihara et al.

[11] Patent Number: 5,847,893
[45] Date of Patent: Dec. 8, 1998

[54] RECORDING AND/OR REPRODUCING APPARATUS FOR RECORDING MEDIUM AND RECORDING AND/OR REPRODUCING METHOD

[75] Inventors: Katsumi Ishihara; Norihiko Noguchi, both of Kanagawa, Japan

[73] Assignee: Sony Corporation, Tokyo, Japan

[21] Appl. No.: 647,902

[22] PCT Filed: Oct. 11, 1995

[86] PCT No.: PCT/JP95/02075

§ 371 Date: Sep. 20, 1996

§ 102(e) Date: Sep. 20, 1996

[87] PCT Pub. No.: WO96/12276

PCT Pub. Date: Apr. 25, 1996

[30] Foreign Application Priority Data

Oct. 12, 1994 [JP] Japan ................................. 6-273018

[51] Int. Cl.⁶ ............................................. G11B 15/087
[52] U.S. Cl. ................................. 360/74.4; 360/72.2
[58] Field of Search .......................... 360/74.4, 74.1, 360/72.2, 72.1

[56] References Cited

U.S. PATENT DOCUMENTS

| 4,270,152 | 5/1981 | Ida . |
| 4,423,443 | 12/1983 | Ueki . |
| 4,607,300 | 8/1986 | Aoyagi . |
| 4,916,561 | 4/1990 | Ng et al. ............................ 360/74.1 |
| 5,572,378 | 11/1996 | Schwarz et al. .................. 360/74.4 X |

FOREIGN PATENT DOCUMENTS

| 0083207 | 7/1983 | European Pat. Off. . |
| 2680427 | 2/1993 | France . |
| 5-62106 | 3/1993 | Japan . |

*Primary Examiner*—Aristotelis M. Psitos
*Assistant Examiner*—James L. Habermehl
*Attorney, Agent, or Firm*—Jay H. Maioli

[57] ABSTRACT

A recording and/or reproducing apparatus adapted for allowing a recording and/or reproducing head and a recording medium to relatively be driven in a first movement direction and in a second movement direction opposite to the first movement direction in order to carry out recording and/or reproduction of information signals. This recording and/or reproducing apparatus is operative so that, in relatively driving the recording and/or reproduction head and the recording medium in the first movement direction and in the second movement direction opposite to the first movement direction to record signals onto the recording medium, determination of total recording time of the signal recorded onto the recording medium to record, onto the recording medium, at the time point when substantially one half of the total recording time is passed, reverse designation information for reversing relative movement direction between the recording and/or reproducing head and the recording medium at the time of reproduction of the recording medium to reverse relative movement direction between the recording medium and the recording and/or reproducing head to record signal onto the recording medium by the recording and/or reproducing head. In this way, it is possible to continuously record and reproduce, in a continuous manner, information such as desired one unit or a series of music information, etc. while reversing movement direction of the recording medium.

21 Claims, 7 Drawing Sheets

RECORDING AND/OR REPRODUCING APPARATUS FOR RECORDING MEDIUM AND RECORDING AND/OR REPRODUCING METHOD

TECHNICAL FIELD

This invention relates to a recording and/or reproducing apparatus for a recording medium and a recording and/or reproducing method, which are adapted for allowing a recording and/or reproducing head and a recording medium to relatively undergo movement operations to thereby carry out recording of information signals with respect to the recording medium, or to carry out reproduction of information signals recorded on the recording medium. More particularly, this invention relates to a recording and/or reproducing apparatus for a recording medium and a recording/reproducing method therefor in which, at the time of recording of information signals with respect to the recording medium, reverse designation information for reversing relative movement direction of the recording and/or reproducing head and the recording medium at the time of reproduction of the recording medium is recorded to automatically reverse the movement direction of the recording medium on the basis of the reverse designation information, thus making it possible to reproduce information signals extending over the reciprocating directions.

BACKGROUND ART

Hitherto, tape recorders using a magnetic tape as a recording medium on which information signals such as music signals, etc. are recorded are known. In tape recorders of this kind, there are tape recorders having an automatic reverse function (hereinafter simply referred to as auto-reverse function depending upon circumstances) to automatically reverse the traveling direction of the magnetic tape from the forward (FWD) direction of the traveling state in the direction of the outgoing path to the reverse (REV) direction of the traveling state in the direction of the return (incoming) path, thereby making it possible to reproduce information signals recorded on the magnetic tape extending over the reciprocating directions in which the magnetic tape travels.

In such tape recorders having the auto-reverse function, as a system of reversing the traveling direction of the magnetic tape, there is known a system for detecting that a magnetic tape caused to undergo traveling operation is entirely wound onto one tape reel and rotation of a pair of tape reels is stopped to thereby reverse the traveling direction of the magnetic tape, and there is known a system for detecting a leader tape connected to the end portion of the magnetic tape to reverse the traveling direction of the magnetic tape.

Further, in the system of reversing traveling direction of the magnetic tape, there is also known a system of detecting that the magnetic tape has traveled to termination in the traveling state in the reverse (REV) direction to thereby reverse the traveling direction so that it is in correspondence with the forward (FWD) direction. In addition, there are also known tape recorders adapted for carrying out endless reproduction (playback) in which the operation for reversing the traveling direction of the magnetic tape from the forward (FWD) direction to the reverse (REV) direction and the operation for reversing it from the reverse (REV) direction to the forward (FWD) direction are combined so that a single magnetic tape can be repeatedly reproduced extending over reciprocating directions.

Meanwhile, in accordance with the conventional auto-reverse systems used in the conventional tape recorders, the operation for reversing the traveling direction in the vicinity of the tape end of the magnetic tape caused to undergo traveling operation is carried out in all systems. For this reason, in the case where the endless reproduction is carried out, the repetitive reproduction (playback) time of one endless reproduction operation in the reciprocating directions is determined by the length of the magnetic tape used. Further, in tape recorders of the auto-reverse system, in the case where a magnetic tape on which only music information having short time as compared to the recordable time is recorded is reproduced, portions where no music information is recorded would be unnecessarily reproduced.

For example, in the case where music information in which 50 minutes is caused to be one unit is recorded onto a magnetic tape where music information of 60 minutes can be recorded by reciprocating operation, generally the music information of 30 minutes that is recorded at the outgoing path side, i.e., side A of the magnetic tape and music information of 20 minutes that is recorded at the incoming or return path side, i.e., side B of the magnetic tape. When this magnetic tape is caused to undergo endless reproduction (playback) to continuously carry out reproduction extending over the reciprocating directions, a soundless state of 10 min. is reproduced every time the repetitive operation occurs in the reciprocating directions. An approach is employed to record, into the soundless portion of 10 minutes, music information of the suitable portion corresponding to 10 minutes where 50 minutes are caused to be one unit, or any other music information is recorded thereinto by 10 minutes, thereby making it possible to prevent reproduction in the soundless state. However, such reproduction of music information does not permit an operation to serially reproduce music information where one unit is constituted by 50 minutes, i.e., would not be caused to be an operation to continuously carry out unified reproduction of music information of one unit.

In order to reproduce music information of one unit or a series of music information, while allowing the magnetic tape to undergo traveling operation in the state where it is automatically reversed extending over the reciprocating directions, by using a tape recorder having the auto-reverse function, there is a necessity of preparing a magnetic tape having recordable time in conformity with the time of information such as music information, etc. to be recorded.

However, since the length of information such as music information, etc. recorded onto the magnetic tape is diverse, it is necessary in order to conform with the diverse information to prepare magnetic tapes in which the recordable time of the information signal changes accordingly. As a result, there takes place the necessity of providing magnetic tapes in which recordable times are slightly varied, resulting in increased number of kinds of products. This constitutes the increase in cost from viewpoints of mass-producibility and/or stock management. Moreover, for user, labor to search for a magnetic tape of length in conformity with the time of music information, etc. to be recorded is required. In addition, there are also instances where all of magnetic tapes in conformity with the time of desired music information, etc. are not merchandised. Moreover, a method in which many kinds of magnetic tapes having different recordable times are prepared in advance is wasteful and uneconomical. Further, even in the case where magnetic tape conforming to the time of music information, etc. to be recorded cannot be obtained, and a magnetic tape having a recordable time approximate to the time of music information, etc. to be recorded is selected, there are instances where error of about several minutes takes place. As a result, the situation where information such as music information of desired one unit or a series of music information, etc. fails to be continuously reproduced while allowing the magnetic tape to undergo traveling operation in the state where it is automatically reversed extending over the reciprocating directions.

DISCLOSURE OF THE INVENTION

An object of this invention is to provide a recording and/or reproducing apparatus and a recording and/or reproducing method therefor, which are adapted to record reverse designation information to designate reversal of movement direction at an arbitrary position of a recording medium on which information signals such as music signal, etc. are recorded, and to reverse, at an arbitrary position, movement direction of the recording medium caused to undergo relative movement with respect to recording and/or reproducing head to permit recording and/or reproduction of information signals such as music signals, etc. to be carried out.

Another object of this invention is to provide a recording and/or reproducing apparatus and a recording and/or reproducing method therefor which can continuously record and reproduce information such as music information of desired one unit or a series of music information, etc. as a series of information while reversing the movement direction of the recording medium.

A further object of this invention is to provide a recording and/or reproducing apparatus and a recording and/or reproducing method therefor where information such as music information of one unit or a series of music information, etc. is recorded while reversing the movement direction of a recording medium, such information can be securely recorded without generating portions without music information.

A still further object of this invention is to provide a recording and/or reproducing apparatus and a recording and/or reproducing method therefor in which information signals are recorded onto a recording medium are caused to undergo relative movement in a first movement direction and in a second direction which is opposite to the first movement direction with respect to a recording and/or reproducing head, an operation is conducted to record, at recording end (termination) position of the recording medium corresponding to any one of movement direction of the first and second movement directions, high speed retrieval designation information for retrieving leading position of a signal recorded in correspondence with the other movement direction so that rapid reproduction of signals recorded in correspondence with the other movement direction can be made.

A recording and/or reproducing apparatus for a recording medium according to this invention which has been proposed in order to attain objects as described above comprises: a drive mechanism for driving a recording and/or reproducing head and the recording medium relatively in a first movement direction and in a second movement direction which is opposite to the first movement direction; a reverse information output circuit operative so that, at the time of recording of signals with respect to the recording medium, it generates, at the time point when substantially one half of total recording time is passed, reverse designation information for reversing relative movement direction of the recording and/or reproducing head and the recording medium at the time of reproduction of the recording medium; and a control section operative to record the reverse designation information generated by the reverse information output circuit at recording end position of at least any one of the first and second movement directions of the recording medium by the recording and/or reproducing head to reverse relative movement direction of the recording medium and the recording and/or reproducing head, and to control the drive mechanism on the basis of the reverse designation information recorded on the recording medium at the time of reproduction of the recording medium to reverse the movement direction from one movement direction of the first and second movement directions of the recording medium to the other movement direction.

Moreover, the recording and/or reproducing apparatus according to this invention further comprises means for setting total recording time on the basis of recording time at the time of first relative movement direction of the recording and/or reproducing head and the recording medium and recording time at the time of second relative movement direction of the recording and/or reproducing head and the recording medium, wherein the setting means makes a setting such that the recording time in the first movement direction is longer than the recording time in the second movement direction.

Further, the recording and/or reproducing apparatus further comprises a memory for storing signals with respect to the recording medium, whereby when the drive mechanism for the recording medium is controlled by the control unit to reverse the movement direction from one of the first and second movement directions to the other, signals to be recorded onto the recording medium are temporarily stored into the memory.

The recording and/or reproducing apparatus according to this invention is operative so that when the recording and/or reproducing head and the recording medium are driven relatively in a first movement direction and in a second movement direction opposite to the first movement direction to record signals onto the recording medium, total recording time of a signal recorded onto the recording medium is determined to record, onto the recording medium, at the time point when substantially one half of the total recording time is passed, reverse designation information for reversing relative movement direction of the recording and/or reproducing head and the recording medium at the time of reproduction of the recording medium to reverse the relative movement direction of the recording medium and the recording and/or reproducing head to record the signal with respect to the recording medium by the recording and/or reproducing head.

Furthermore, a recording and/or reproducing apparatus according to this invention comprises: a drive mechanism for relatively driving a recording and/or reproducing head and a recording medium in a first movement direction and in a second movement direction opposite to the first movement direction; a skip flag output circuit operative to generate high speed retrieval designation information for carrying out an operation to retrieve the leading position of a signal recorded, from recording end position with respect to one of the first and second relative movement directions of the recording medium and the recording and/or reproducing head, in correspondence with the other movement direction; and a control section operative to record the high speed retrieval designation information generated by the skip flag output circuit at a recording end position of the recording medium corresponding to any one of the first and second movement directions, and to control, at the time of reproduction of the recording medium, the drive mechanism on the basis of the high speed retrieval designation information recorded onto the recording medium to start an operation to retrieve the leading position of the signal recorded on the recording medium.

Furthermore, a recording and/or reproducing apparatus according to this invention comprises: a drive mechanism for relatively driving a recording and/or reproducing head and a recording medium in a first movement direction and in a second movement direction opposite to the first movement direction; a skip flag output circuit operative so that, at the time of recording signals of the recording medium, it generates, at the time point when substantially one half of total recording time is passed, reverse designation information for reversing relative movement direction of the recording and/or reproducing head and the recording medium at the time of reproduction of the recording medium, and generates high speed retrieval designation information for carrying out an operation to retrieve leading position of a signal recorded, from recording end position with respect to one of the first and second movement directions of the recording medium and the recording and/or reproducing head, in correspondence with the other movement direction; and a control section operative to record the reverse designation information generated by the skip flag output circuit at recording end position of at least any one of the first and second movement directions of the recording medium by the recording and/or reproducing head to reverse relative movement direction of the recording medium and/or the reproducing head, and to control the drive mechanism on the basis of the reverse designation information recorded on the recording medium at the time of reproduction of the recording medium to reverse the movement direction from any one of the first and second movement directions of the recording medium to the other movement direction to record the high speed retrieval designation information generated by the skip flag output circuit at recording end position of the recording medium corresponding to any one of the first and second movement directions, and to control the drive mechanism for the recording medium on the basis of the high speed retrieval designation information recorded on the recording medium to start an operation to retrieve leading position of a signal recorded on the recording medium.

BEST MODE FOR CARRYING OUT THE INVENTION

A preferred more practical embodiment to which this invention is applied will now be described with reference to the attached drawings.

Figure 1:
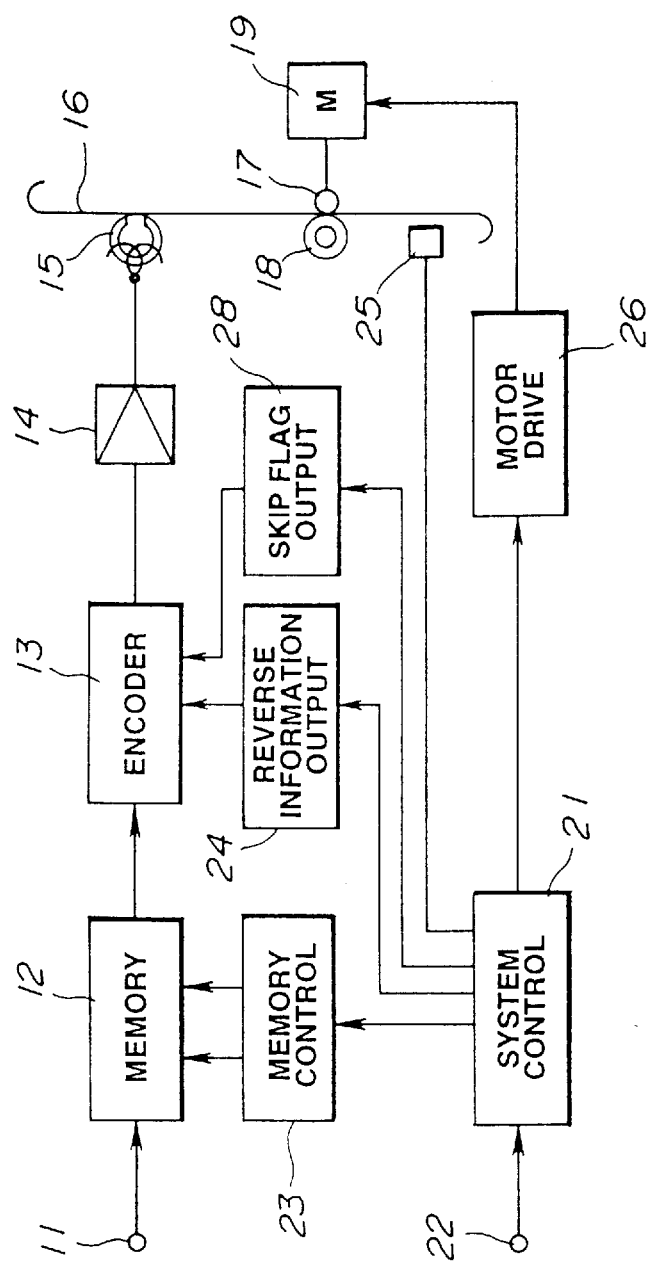
FIG. 1 is a block circuit diagram of a recording and/or reproducing apparatus according to this invention.
Figure 2:
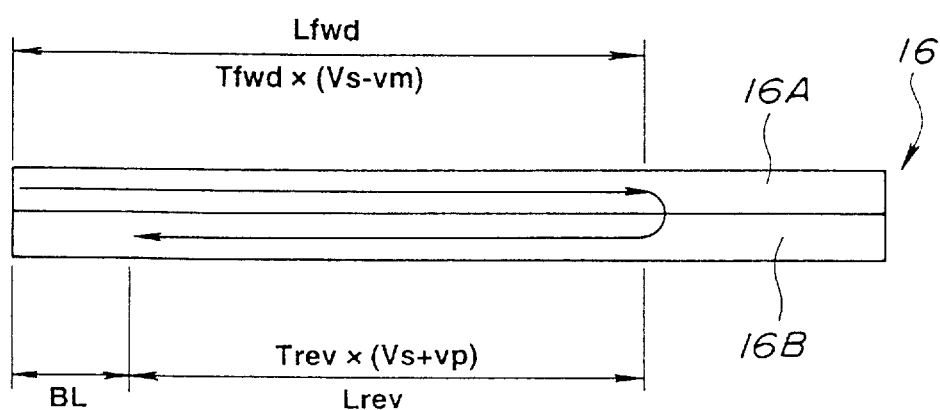
FIG. 2 is a view for explaining the principle of reverse time setting at the time of recording information signal.
Figure 3:
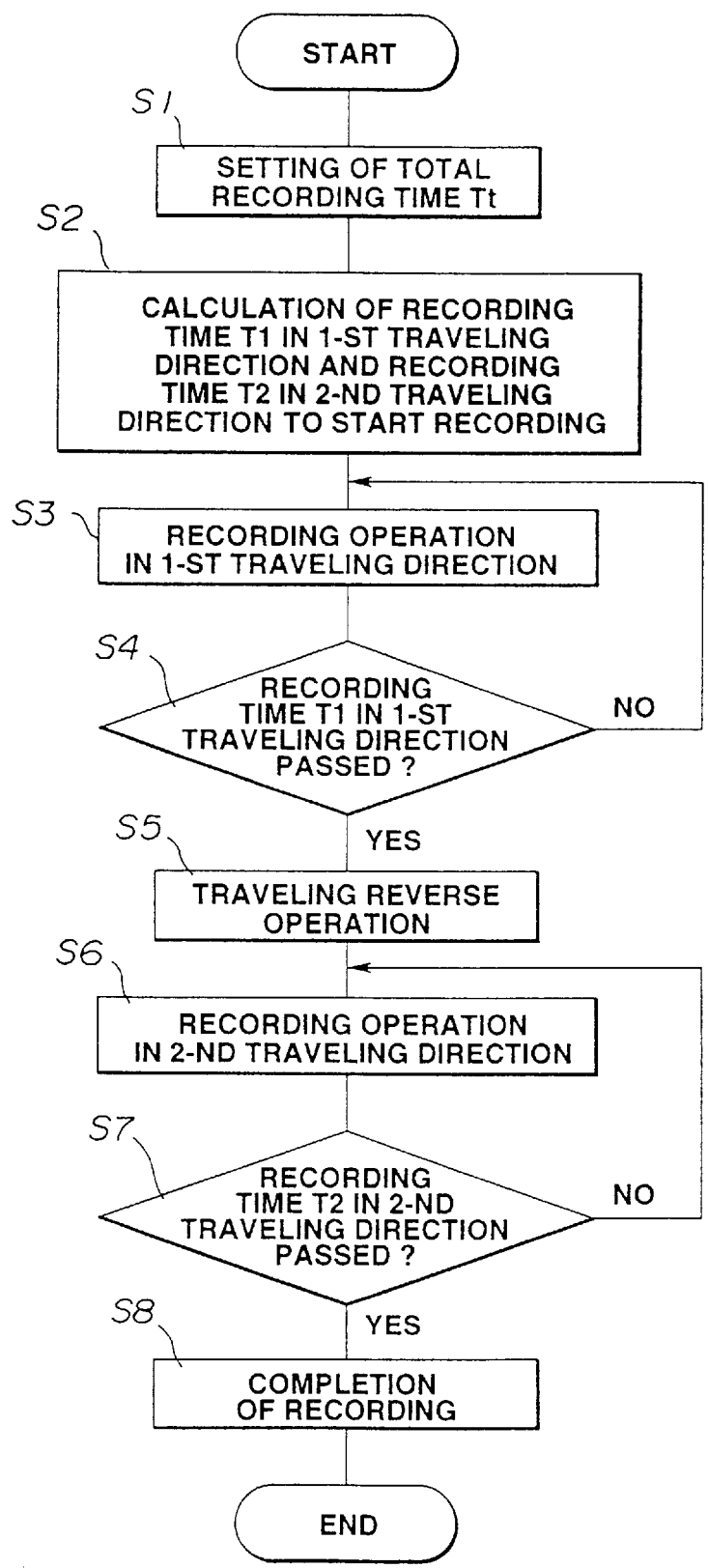
FIG. 3 is a flow chart for explaining recording operation including traveling reverse operation.

FIG. 1 shows a recording and/or reproducing apparatus for a recording medium according to this invention for realizing a signal recording/reproducing method according to this invention, and is a block circuit diagram showing the recording system of a tape recorder using a tape shaped recording medium (hereinafter simply referred to as a tape) like a magnetic tape as the recording medium. FIG. 2 is a view for explaining the principle of reverse time setting at the time of recording, and FIG. 3 is a flow chart for explaining the operation at the time of recording. The tape recorder of this embodiment is a digital audio tape recorder using a magnetic head as recording and/or reproducing means for information signal, which is compact so as to have dimensions such that they can be carried, i.e., down to portable size.

It should be noted that this invention can be applied not only to a tape recorder but also to other recording and/or reproducing apparatuses, and information signals recorded onto the recording medium, other than music signals may be employed, and also video signals or data signals handled by information processing equipment may be applied to recording and/or reproducing apparatus.

Initially, in the block circuit diagram shown in FIG. 1, an input terminal 11 is supplied with a digital audio signal as an information signal. This digital audio signal is sent to a memory 12, at which it undergoes write-in/read-out control. The digital audio signal which has been caused to undergo such write-in/read-out control is sent to a recording head 15 through an encoder 13 and through a recording amplifier 14, at which it is recorded onto a tape 16 as a recording medium. This tape 16 is operated so that it is caused to travel in a predetermined direction by a capstan 17 and a pinch roller 18, and undergoes reverse control such that the traveling direction is opposite to the traveling direction until now at a predetermined traveling position. The capstan 17 is rotationally driven by a motor 19.

A system control circuit 21 for controlling operations of respective components of this apparatus is supplied with a signal such as an operation input, a set (set-up) input or a control input, etc. through an input terminal 22, and sends a control signal to a memory control circuit 23, a reverse information output circuit 24, a motor drive circuit 26, and a skip flag output circuit 28, which will be described later, provided as occasion demands, etc. In addition, the system control circuit 21 is supplied with a detection output from an end sensor 25 which detects termination of the tape. The end sensor 25 detects a detected portion provided at the terminating position or before the terminating position of the tape 16.

The memory control circuit 23 controls write-in/read-out operation of digital audio signals as recording data into the memory 12 in accordance with a control signal from the system control circuit 21 to allow the memory 12 to carry out an operation such as storage, etc. of recording data necessary for conducting no defect reverse operation as described later. The reverse information output circuit 24 generates reverse information for automatically carrying out reverse operation in a traveling direction of the tape 16 at the time of reproduction of the tape 16. The reverse information generated from the reverse information output circuit 24 is delivered to the encoder 13, and is then recorded at a predetermined position on the tape 16 by the recording head 15. Moreover, the skip flag output circuit 28 generates a skip flag which will be described later. The skip flag thus generated is delivered to the encoder 13, and is then recorded at a predetermined position on the tape 16 by the recording head 15.

Meanwhile, when recording is carried out with respect to the tape in the auto-reverse state at the recording and/or reproducing apparatus such as an ordinary tape recorder, etc., the system control circuit 21 reverses tape traveling direction from one direction, e.g., forward (FWD) direction to reverse (REV) direction to the opposite direction when the portion in the vicinity of termination of the tape 16 is reached by detection output from the end sensor 25 to continuously (successively) record signals onto the tape 16 as the recording medium. The total recording time in reciprocating directions in this case corresponds to the length itself of the tape 16.

On the contrary, in this embodiment, total recording time Tt as sum of the recording time $T_{fwd}$ in the forward (FWD) direction and the recording time $T_{rev}$ in the reverse (REV) direction is set in correspondence with recording time of music information as signal source to be recorded.

In this case, as the most simple example, it is conceivable to allow recording times $T_{fwd}$ and $T_{rev}$ in respective directions to be respectively Tt/2 which is one half of the total recording time Tt. In practice, however, by taking into consideration variations (unevenness) of traveling velocity (speed) of the tape 16, setting is made such that the recording time $T_{fwd}$ in the forward direction is longer than the recording time $T_{rev}$ in the reverse direction. The reason why such setting is adopted is that quantity of consumption of the tape at the time of traveling in the reverse direction is greater than quantity of consumption of the tape at the time of traveling in the forward direction, i.e., recording time, that is, the recording time is prolonged so that tape in recording in the reverse direction is insufficient.

FIG. 2 is a view for explaining the fundamental principle of setting of recording times $T_{fwd}$, $T_{rev}$ in respective directions of the forward direction and the reverse direction, or setting of reverse position from the initial end of the tape, particularly setting of reverse time indicating elapsed time from the initial end of the tape.

In FIG. 2, it is assumed that traveling velocity of the standard tape 16 is Vs, velocity error of the tape of the +side i.e., error in the case where current traveling speed is higher than the traveling velocity of the standard tape is vp, and velocity error of the tape of the −side, i.e., error in the case where current velocity is lower than the traveling velocity of the standard tape is vm. Between the tape length $L_{fwd}$ 16 actually spent in recording signal with respect to the recording area 16A when the tape 16 travels in the forward direction and the tape length $L_{rev}$ spent for recording of signal into the recording area 16B at the time of traveling in the reverse direction, it is required that $L_{fwd} \geq L_{rev}$ necessarily holds for the above-described reason. From facts as above, in the worst error state, i.e., in the case where the traveling velocity of the tape in the forward direction is the lowest and the traveling velocity of the tape in the reverse direction is the highest, it is sufficient that the above-described condition $L_{fwd} \geq L_{rev}$. Thus, as the condition between recording times $T_{fwd}$, $T_{rev}$ in respective directions, as shown in FIG. 2, it is required to satisfy the following formula:

$$T_{fwd}(Vs-vm) \geq T_{rev}(Vs+vp) \quad \ldots (1)$$

On the basis of the formula (1) obtained in this way and the fact that total recording time Tt is equal to $T_{fwd}+T_{rev}$, the above-described formula (1) is written as follows:

$$T_{fwd}=(Vs-vp)/(2Vs-vm+vs) \quad \ldots (2)$$

It is sufficient to set reverse time on the basis of the above-mentioned formula (2).

Meanwhile, in the case where digital audio tape recorder is reduced to portable size using rotary head as the recording and/or reproducing apparatus, the configuration in which small pinch roller is provided within the tape cassette within which tape 16 is accommodated. For this reason, dimensional error of diameter or eccentricity of the pinch roller appears as error of tape traveling velocity. In practice, there results velocity error of about +2% to −1% with respect to the standard tape traveling velocity. In such a case, setting of reverse time is particularly important.

FIG. 3 is a flow chart for explaining such automatic reverse recording operation.

In FIG. 3, at the first step S1, total recording time Tt is set in correspondence with recording time of music information to be recorded onto the tape 16. At the subsequent step S2, the recording time $T_1$ in the first traveling direction and the recording time $T_2$ in the second traveling direction of the tape 16 are calculated thereafter to start recording of information signals with respect to the tape 16. These times $T_1$, $T_2$ respectively correspond to recording times $T_{fwd}$, $T_{rev}$ in the forward direction as the first direction and in the reverse direction as the second direction as described above, and are calculated on the basis of the above-described formula (2), etc. It is not necessarily required to start recording of information signals onto the tape 16 from the state where travels in the forward direction, but an approach may be employed to start recording from the reverse direction.

At the subsequent step S3, recording operation in the forward direction as the first direction is carried out. At the subsequent step S4, discrimination as to whether or not recording time $T_1$ in the first traveling direction is passed is made. For a time period during which recording time $T_1$ in the first traveling direction is not passed, the processing operation returns to the step S3 to continue the recording operation of signal in the first traveling direction. On the other hand, when the recording time $T_1$ in the first traveling direction is passed, the processing operation proceeds to the subsequent step S5 to carry out traveling reverse operation to reverse the traveling direction of the tape 16.

After the traveling reverse operation is carried out at the step S5, the processing operation proceeds to step S6 to allow the tape 16 travel in the reverse direction as the second traveling direction to carry out recording of information signal. During the recording operation in the second traveling direction, whether or not the recording time $T_2$ in the second traveling direction is passed is discriminated at step S7. When the discrimination result of NO is provided, the processing operation returns to the step S6 to continue the recording operation in the second traveling direction. When the discrimination result of YES is provided, the processing operation proceeds to the subsequent step S8 to complete the recording operation in the second traveling direction.

Meanwhile, in automatically reversing the traveling direction of the tape 16 to carry out reproduction of signal recorded on the tape 16, there is the possibility that reproduction signal may be interrupted for the time required for reverse operation. For this reason, in this embodiment, non-defect reverse operation in which memory is used to prevent interruption of reproduction signal followed by reverse operation in the traveling direction of the tape 16 is realized. This non-defect reverse system is a system to temporarily store, into the memory, digital audio signals which have been read out from the tape 16 as reproduction data corresponding to either the time required for reverse operation in the traveling direction of the tape 16 or that time plus time before the reverse operation occurs to read out data stored in the memory during the reverse operation in the traveling direction of the tape 16 to thereby continuously output reproduction signal to eliminate interruption of reproduction signals at the time of reverse operation.

In more practical sense, as shown in FIG. 4, an approach is employed to allow the traveling velocity of the tape 16 to be higher from the position $x_W$ preceding by predetermined length with respect to the reverse position $x_R$ of the tape 16 detected on the basis of output from the end sensor 25 to store, into the memory, data quantity which is the difference between quantity of data which has been read out from the tape 16 and data quantity required for reproduction of actual audio signal so that data quantity corresponding to the time required for reverse operation in the traveling direction of the tape 16 or this time plus additional time can be stored in the memory at the time when the reverse position $x_R$ is reached. For this reason, recording of signal onto the tape 16 is carried out by determining, by calculation, storage start position $x_W$ on the basis of the reverse position $x_R$ to write reverse designation information such as reverse flag, etc. at that position $x_W$. In more practical sense, an approach may be employed to write down count value such that numeric value decreases from the position $x_W$ toward the reverse position $x_R$. In this case, by writing such a down count value to take a predetermined value, e.g., 1 or 0 at the reverse position $x_R$, it is possible to recognize distance or time up to the reverse position $x_R$ by the system control circuit 21. The reverse information output circuit 24 generates, in accordance with command from the system control circuit 21 of FIG. 1, reverse information such as down count value or reverse flag, etc. The reverse information thus generated is delivered to the encoder 13, and is recorded from a predetermined position, i.e., storage start position $x_W$ on the tape 16.

Figure 4A:
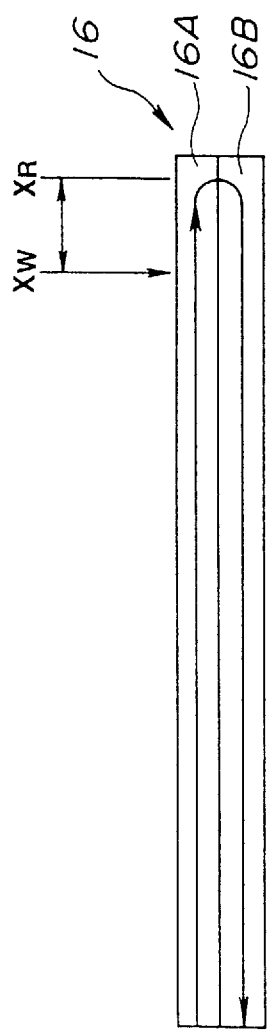
FIGS. 4A–4C is a view showing an example of reverse position and data storage start position at the time of no defect reverse operation.
Figure 4B:
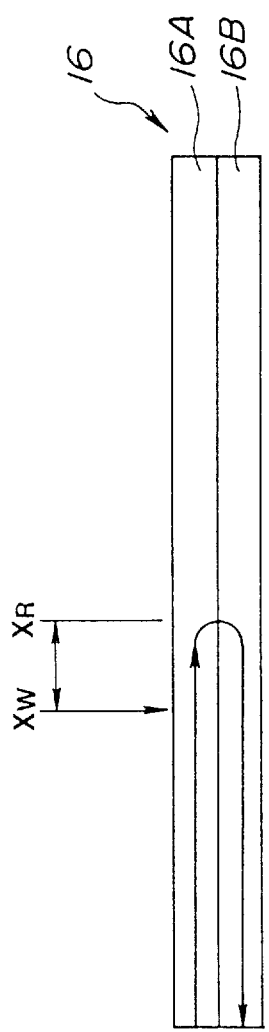
Figure 4C:
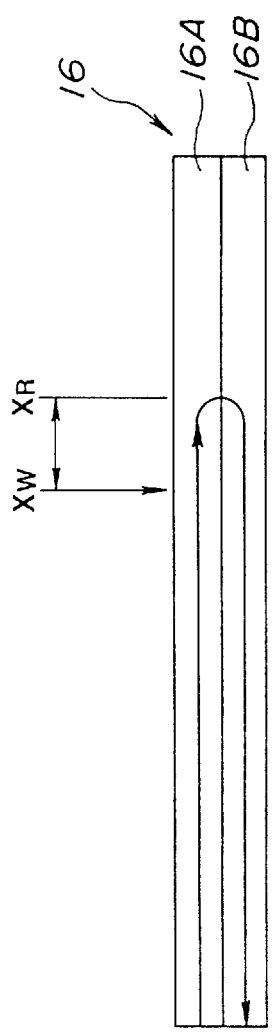

FIGS. 4A to 4C show examples of reverse position $x_R$ and storage start position $x_W$ in the case of the above-described non-defect reverse operation. Namely, FIG. 4A shows the example where the traveling direction is reversed at the tape end. At the time of recording, tape quantity remaining is determined on the basis of information obtained by detecting rotation of the reel table allowing the calculation of the time until the scheduled reverse position occurs from the determined tape remaining quantity to calculate storage start position $x_W$ necessary for traveling reverse operation at the time of reproduction. Moreover, FIGS. 4B and 4C show the example where scheduled reverse position $x_R$ is calculated in advance in dependency upon recording time of music information as described above. An approach may be employed to determine storage start position $x_W$ on the basis of the position $x_R$ to record reverse designation information from that position $x_W$. It is preferable that the scheduled reverse position $x_R$ in this case is set so as to satisfy condition such that the recording time $T_1$ in the first direction, i.e., recording time $T_{fwd}$ in the forward direction is longer than the recording time $T_2$ in the second traveling direction, i.e., recording time $T_{rev}$ in the reverse direction.

Meanwhile, when setting of recording time is made such that the recording time $T_{fwd}$ in the forward direction which is the recording time $T_1$ in the first traveling direction is longer than the recording time $T_{rev}$ in the reverse direction which is the recording time $T_2$ in the second traveling direction as described above, there are many instances where unrecorded or not yet recorded blank portion BL takes place at the portion after recording has been completed of the recording area 16B at the time of recording in the reverse direction, i.e., the initial end side when viewed from the recording area 16A. When such blank portion exists over along space on the tape, e.g., about several minutes in terms of time, endless reproduction cannot be satisfactorily carried out.

Figure 5:
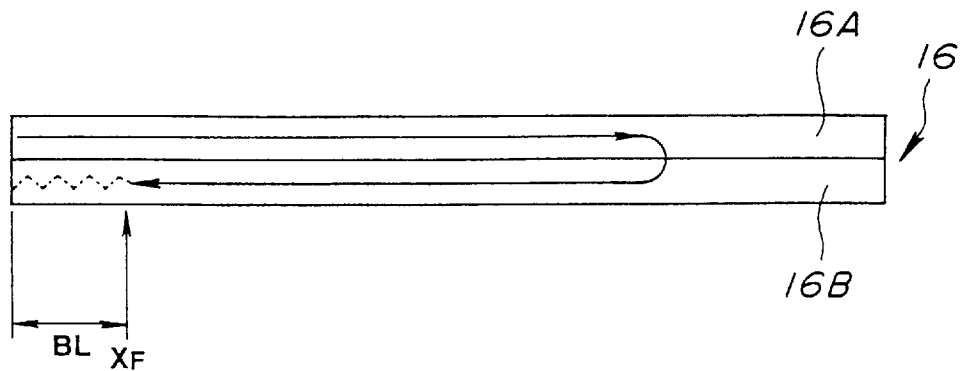
FIG. 5 is a view for explaining skip flag for endless reproduction.

In view of the above, in this embodiment, as shown in FIG. 5, high speed retrieve designation information of the next recording content, e.g., skip flag or skip mark which searches for the leading position start flag is recorded at the recording end position $x_F$ in the reverse direction. This skip flag is generated by the skip flag output circuit 28 in accordance with command from the system control circuit 21 of FIG. 1. The skip flag thus generated is delivered to the encoder 13, and is then recorded onto the tape 16 by the recording head 15. When this skip flag is detected at the time of reproduction, the operation is switched into the high speed (velocity) traveling operation for retrieving leading position of the next music. In this high speed retrieval operation, even if the end portion of the tape is reached, such operation is continued in the state where traveling direction of the tape 16 is reversed.

Figure 6:
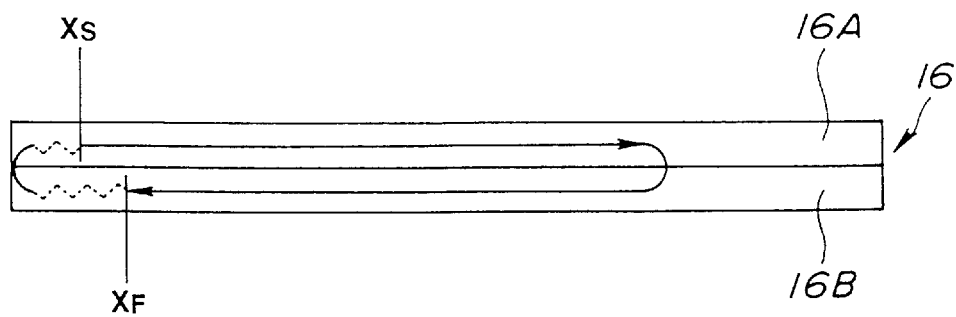
FIG. 6 is a view for explaining skip operation for endless reproduction.

For example, as shown in FIG. 6, even in the case where recording start position $x_S$ in the forward direction is away from the initial end portion of the tape 16 when viewed from the recording area 16A, when skip flag is detected at the recording end position $x_F$ in the reverse direction at the time of reproduction of the recording area 16B, the tape 16 is fed at a high speed in the reverse direction. Thus, leading position search operation to search for leading position of the next music is carried out. When the terminating portion of the tape 16 in the case where viewed from the recording area 16B, i.e., the initial end portion of the tape 16 in the case where viewed from the recording area 16A is reached, the traveling direction is reversed. The tape 16 is in turn fed at a high speed in the forward direction. Thus, leading position search operation to search leading position of the next music is carried out.

Figure 7:
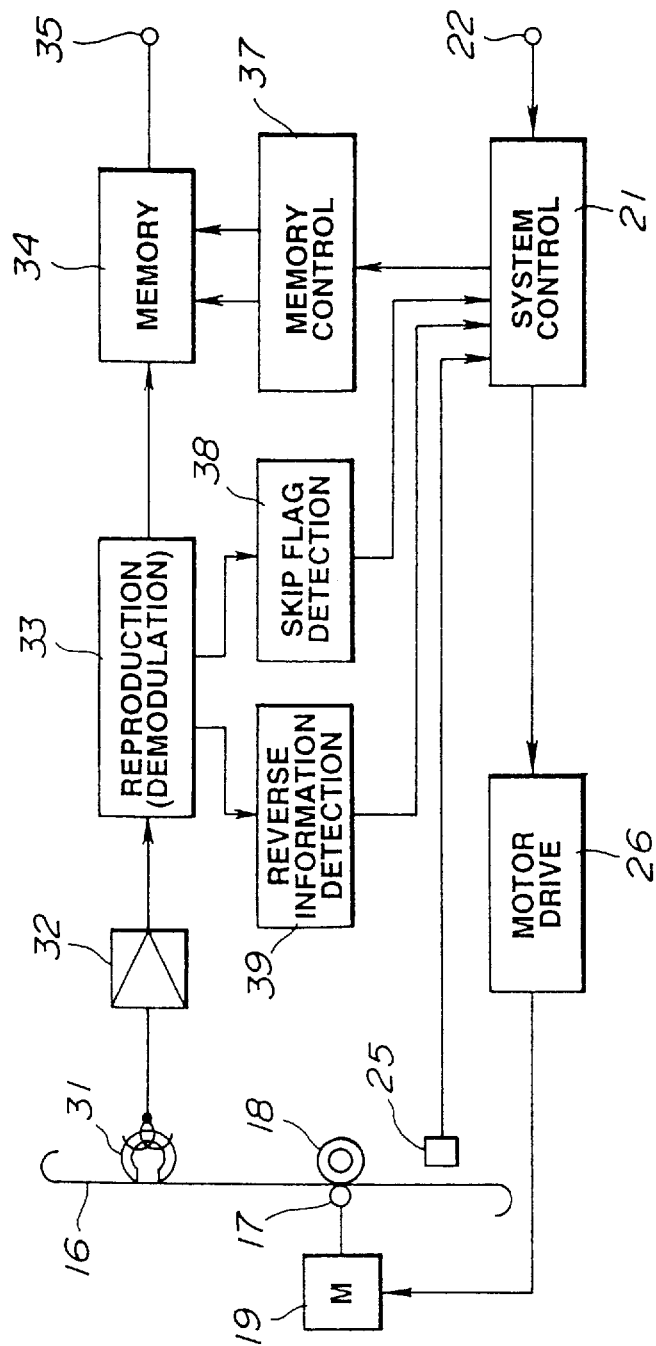
FIG. 7 is a block circuit diagram showing outline of the configuration of an example of a signal reproducing unit for carrying out automatic reverse operation and skip operation.

An example of the reproduction system of the recording and/or reproducing apparatus for carrying out such reproduction operation is shown in FIG. 7.

In FIG. 7, a signal recorded on the tape 16 is read by a reproduction head 31, and is delivered to a reproduction processing circuit or demodulation circuit 33 through a reproduction amplifier 32. Thus, a reproduction signal from the reproduction processing circuit 33 is taken out from a terminal 35 through a memory 34. The memory 34 undergoes write-in/read-out control by a memory control circuit 37. At the reproduction processing circuit 33, detection of skip flag recorded on the tape 16 is carried out by a skip flag detecting circuit 38, and detection of reverse information recorded on the tape 16 is carried out by a reverse information detection circuit 39. These respective outputs from the skip flag detecting circuit 38 and the reverse information detecting circuit 39 are delivered to the system control circuit 21.

In FIG. 7, common reference numerals are respectively attached to the portions common to the recording system shown in FIG. 1, and their detailed explanation will be omitted.

The above-described non-defect reverse operation will now be described. When reproduction in the forward direction is developed so that reverse information from the storage start position $x_W$ is detected by the reverse information detecting circuit 39 in a signal from the reproduction processing circuit 33, this detection output is delivered to the system control circuit 21. When the detection output from the detection circuit 39 is delivered, the system control circuit 21 controls the motor drive circuit 26 to allow the traveling velocity of the tape to be higher, and to control the memory control circuit 37 to start storage or write-in operation of reproduction data from the reproduction processing circuit 33. When the reverse information detecting circuit 39 detects that the tape 16 is traveled so that the reverse position $x_R$ is reached, the system control circuit 21 controls the motor drive circuit 26, etc. to reverse the traveling direction of the tape 16. For a time period during which read-out operation of signal is not carried out from the tape 16 subject to reverse operation, data stored in the memory 34 is read out to thereby prevent interruption of music signal outputted after undergoing reproduction. Thus, continuous reproduction of music signals is carried out. When the reverse operation in the traveling direction of the tape 16 is completed, the reproduction operation in the reverse direction is started.

The endless reproduction using skip flag will now be described with reference to FIG. 8.

Figure 8:
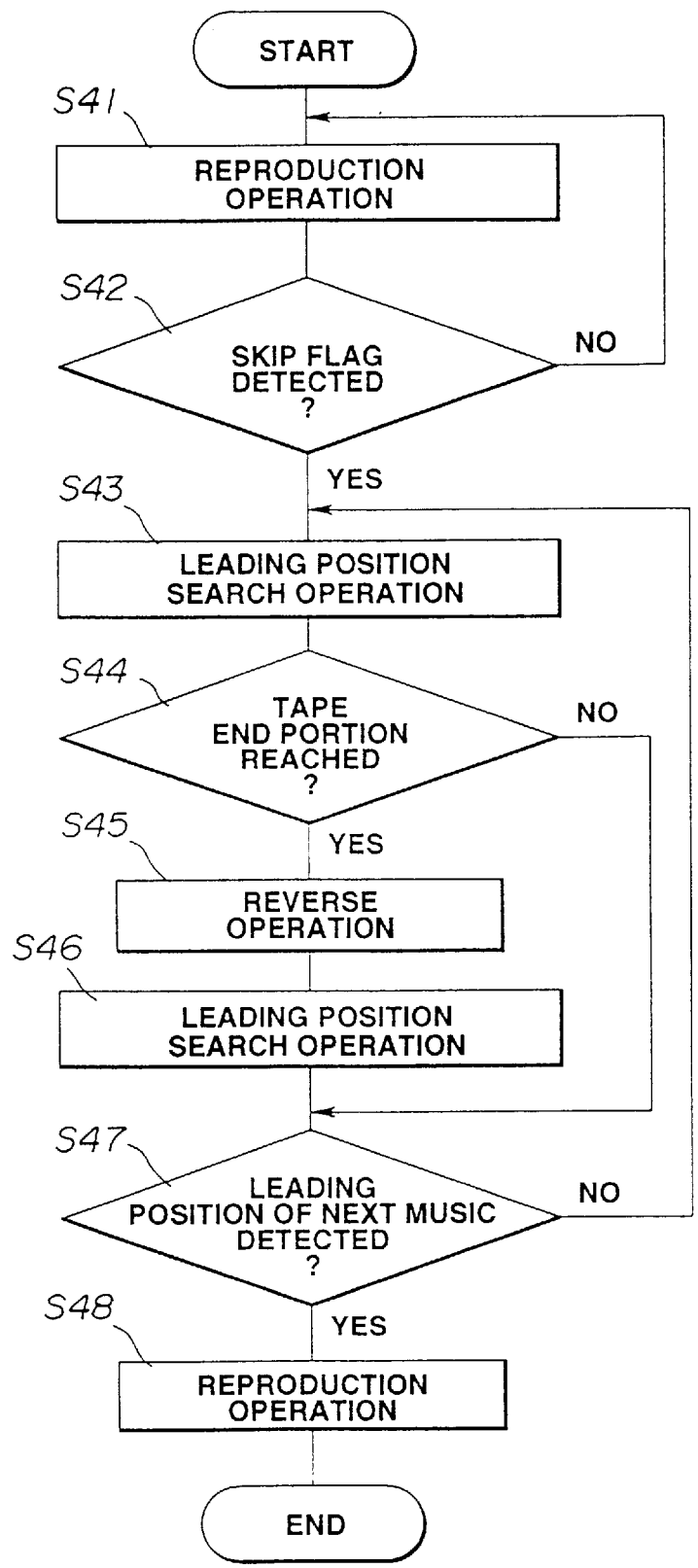
FIG. 8 is a flow chart for explaining skip operation at the time of reproduction.

In FIG. 8, at step S41, reproduction operation, in more practical sense, reproduction operation in the reverse direction is carried out. At this time, at step S42, whether or skip flag is detected at the skip flag detecting circuit 38 of FIG. 7 is discriminated. For a time period during which such skip flag is not detected, the processing operation returns to the step S41. Thus, reproduction operation is continued. When skip flag is detected, the processing operation proceeds to step S43. Thus, high speed leading position search operation, i.e., leading position search operation to search for the leading position of the next music is carried out. This leading position search operation is carried out by running the tape 16 in the reverse direction which is the reproduction direction at the present (current) time point. At the subsequent S44, whether or not the end portion of the tape 16, i.e., in this more practical example, the initial end portion of the tape 16 in the case where viewed from the recording area 16A of the tape 16 is reached is discriminated. In the case of NO, i.e., in the case where such end portion is not reached, the processing operation proceeds to step S47 to discriminate whether or not leading position of the next music is detected. At this step S47, when a discrimination result of NO is provided, i.e., the leading position of the next music is not reached, the processing operation returns to the step S43. Thus, the leading position search operation is continued. For example, when the leading position search operation in the reverse direction is developed so that the initial end portion of the tape 16 in the case where viewed from the recording area 16A is reached, a discrimination result of YES is provided at the step S44. Then, the processing operation proceeds to step S45. Thus, reverse operation of the traveling direction of the tape 16 is carried out. In this example, this operation is the reverse operation from the reverse direction to the forward direction. At the subsequent step S46, the leading position search operation in the forward direction is carried out. Then, the processing operation proceeds to the subsequent step S47. Thus, discrimination of detection of the leading position of the next music is carried out. When the leading position of the next music is detected and a discrimination result of YES is provided at the step S47, the processing operation proceeds to step S48. Thus, ordinary reproduction operation, in this more practical example, reproduction operation in the forward direction is carried out. Since the leading position search operation is continuously carried out in a manner including the reverse operation in this way, the search for leading position of the next music can be carried out in the state where blank portion BL of the tape 16 following the recording termination in the reverse direction, and/or blank portion of the initial end portion of the tape 16 in the forward direction, etc. are skipped at a high speed so that search for leading position of the next music can be made. Thus, satisfactory reproduction having short interruption time can be carried out.

It is to be noted that in the case where a discrimination result of NO is provided at the step S47, since control shifts from the leading position search operation of the step S43 to the routine of the step S44 and steps subsequent thereto, it is necessary to prevent that reciprocating search operation when skip operation takes place in a tape such that search for leading position of music cannot be carried out, such as in unrecorded or not yet recorded tape, etc. where any information signal such as music signal, etc. from endlessly (infinitely) continuing. For this reason, it is preferable to count the number of reverse operation times at the time leading position search operation, or the like to limit the number of the high speed search operations, e.g., at the time of skip operation down to one reciprocating operation thus to protect the tape.

Moreover, while explanation has been given in the above-described example in connection with the case where skip flag is detected at the recording termination in the state where the tape 16 is driven in the reverse direction to reverse traveling direction at the initial end portion of the tape 16 from the high speed search in the reverse direction to the high speed search in the forward direction, an approach may be easily realized in a manner opposite to the above to write skip flag at the recording termination in the forward direction to reverse the traveling direction at the tape end from the leading position search operation in the forward direction to shift to the leading position search operation in the reverse direction.

Further, while the reverse position of the traveling direction of the tape 16 at the time of leading position search operation is the end portion of the tape 16, an approach may be employed to write reverse information such as reverse flag, etc. at the middle position of the tape 16 to carry out reverse operation at this position to shift to leading position search operation in an opposite direction.

In accordance with the embodiment of this invention which has been described above, such an approach is employed to set traveling reverse position or reverse time of the tape which is about one half of the total recording time in correspondence with the time of music information to be recorded to record reverse information such as reverse flag or down count value, etc. from time or tape position earlier at a predetermined time other than the reverse time, and to detect this reverse information at the time of reproduction to write data into the memory to thereby compensate for lacking data (missing data) at the time of reverse operation by read-out operation of memory storage data to carry out no-defect reverse operation, and to return to the position in the vicinity of the initial end portion of the tape in the case where viewed from the forward direction at the time of completion of reproduction after reverse operation. Thus, reverse reproduction is caused to be carried out also at the initial end portion of the tape, whereby endless reproduction can be carried out.

Moreover, in order to prevent that the tape from being insufficient at the time of recording in the reverse direction by taking into consideration variations of the tape traveling speed, an approach is employed to set the recording time in the forward direction to a value longer than the recording time in the reverse direction to place a skip flag at the recording terminating portion in the reverse direction to skip the blank portion, thereby making it possible to record music information to the end even if any variation of speed exists. In addition, at the time of reproduction, the blank reproduction time is skipped (is caused to be as minimum as possible), whereby satisfactory reproduction having short interruption time can be carried out.

It is to be noted that this invention is not limited only to the above-described embodiment. For example, as the recording medium, optical tape, etc. can be used in addition to the magnetic tape. Moreover, also as information signals recorded on the recording medium, not only music signals may be employed, but also video signals or data signals handled in the information processing equipment may be applied to the recording and/or reproducing apparatus.

In addition, rotary head or fixed head may be used as the recording and/or reproducing head.

Industrial Applicability

The recording and/or reproducing apparatus according to this invention is operative so that, in relatively driving the recording and/or reproducing head and the recording medium in a first movement direction and a second movement direction opposite to the first movement direction to record signals onto the recording medium, such an approach is employed to determine total recording time of signal recorded onto the recording medium to record, onto the recording medium, at the time point when substantially one half of the total recording time is passed, reverse designation information for reversing relative movement direction of the recording and/or reproducing head and the recording medium at the time of reproduction of the recording medium to reverse relative movement direction between the recording medium and the recording and/or reproducing head to record signals with respect to the recording medium by the recording and/or reproducing head. Accordingly, it is possible to continuously record and reproduce, in a series manner, information as desired such as one unit or a series of music information, etc. while reversing the movement direction of the recording medium.

What is claimed is:

1. A recording and/or reproducing apparatus comprising:

drive means for relatively driving a recording and/or reproducing head and a recording medium in a first direction and in second direction opposite to the first direction;

generating means for generating at the time of recording of a signal on said recording medium reverse designation information at a point when substantially one half of a total recording time of said recording medium has passed, said reverse designation information indicating reversing relative movement direction between the recording and/or reproducing head and the recording medium at the time of reproduction of the recording medium; and control means operative to record the reverse designation information generated by the generating means at a recording end position wherein said reverse designation information being recorded by the recording and/or reproducing head reverses at least one of the first and second directions of the recording medium to reverse relative movement direction between the recording medium and the recording and/or reproducing head, and to control the drive means by the reverse designation information recorded on the recording medium at the time of reproduction of the recording medium to reverse direction from one direction of the first and second directions of the recording medium to the other direction, and further comprising setting means for setting the total recording time based on the recording time at the time of the first relative movement direction between the recording and/or reproducing head and the recording medium and recording time at the time of the second relative direction between the recording and/or reproducing head and the recording medium, whereby the setting means makes a setting such that the recording time in the first direction is longer than the recording time in the second direction.

2. A recording and/or reproducing apparatus as set forth in claim 1, wherein the setting means determines a recording time $T_{fwd}$ in the first direction as $T_{fwd}=(Vs-vp)/(2Vs-vm+Vs)$ when standard relative movement velocity between the recording and/or reproducing head and the recording medium is Vs, error in a direction where movement velocity is caused to be higher with respect to the standard relative movement velocity is vp, and error in a direction where the movement velocity is caused to be lower with respect with to the standard relative movement velocity is vm.

3. A recording and/or reproducing apparatus comprising:

drive means for relatively driving a recording and/or reproducing head and a recording medium in a first direction and in second direction opposite to the first direction;

generating means for generating at the time of recording of a signal on said recording medium reverse designation information at a point when substantially one half of a total recording time of said recording medium has passed, said reverse designation information indicating reversing relative movement direction between the recording and/or reproducing head and the recording medium at the time of reproduction of the recording medium;

control means operative to record the reverse designation information generated by the generating means at a recording end position wherein said reverse designation information being recorded by the recording and/or reproducing head reverses at least one of the first and second directions of the recording medium to reverse relative movement direction between the recording medium and the recording and/or reproducing head, and to control the drive means by the reverse designation information recorded on the recording medium at the time of reproduction of the recording medium to reverse direction from one direction of the first and second directions of the recording medium to the other direction; and memory means for storing a signal with respect to the recording medium, whereby when the drive means is controlled by the control means to reverse movement direction from one of the first and second directions to the other direction, the signal recorded onto the recording medium is temporarily stored in the memory means, wherein the control means records on the recording medium the reverse designation information generated by the generating means from the time point when writing of the signal recorded onto the recording medium is fed into the memory means.

4. A recording and/or reproducing apparatus comprising:

drive means for relatively driving a recording and/or reproducing head and a recording medium in a first direction and in second direction opposite to the first direction;

generating means for generating at the time of recording of a signal on said recording medium reverse designation information at a point when substantially one half of a total recording time of said recording medium has passed, said reverse designation information indicating reversing relative movement direction between the recording and/or reproducing head and the recording medium at the time of reproduction of the recording medium; and control means operative to record the reverse designation information generated by the generating means at a recording end position wherein said reverse designation information being recorded by the recording and/or reproducing head reverses at least one of the first and second directions of the recording medium to reverse relative movement direction between the recording medium and the recording and/or reproducing head, and to control the drive means by the reverse designation information recorded on the recording medium at the time of reproduction of the recording medium to reverse direction from one direction of the first and second directions of the recording medium to the other direction, further comprising means for generating, at a recording end position of the recording medium corresponding to any one of the first and second directions, high speed retrieval designation information for carrying out an operation to retrieve the leading position of a signal recorded in correspondence with the other direction, at the time of recording of the signal with respect to the recording medium.

5. A recording and/or reproducing apparatus as set forth in claim 4, wherein the control means is further operative to record high speed retrieval designation information generated by the further generating means at a recording end position of the second direction of the recording medium in which a setting is made such that the recording time of the first direction is longer than the recording time of the second direction.

6. A recording and/or reproducing apparatus for a recording medium as set forth in claim 4, the control means further comprising detecting means for detecting the high speed retrieval designation information from the signal been read out by the recording and/or reproducing head, whereby the control means controls the drive means on the basis of a detection output from the further detecting means to start an operation to retrieve the leading position.

7. A recording and/or reproducing apparatus for a recording medium as set forth in claim 4, wherein the control means starts an operation to retrieve the leading position on the basis of a detection output from the detecting means, and commands the drive means to carry out an operation to switch movement direction from one direction of the first and second directions to the other direction at the recording end position of the recording medium and to start an operation to retrieve the leading position.

8. A recording and/or reproducing method for a recording medium wherein a recording and/or reproducing head and the recording medium are relatively driven in a first direction and in a second direction opposite to the first direction to record a signal on the recording medium, the method comprising the steps of:

determining a total recording time of the signal recorded on the recording medium;

recording, on the recording medium, at the point when substantially one half of the total recording time is passed, reverse designation information for reversing relative movement direction between the recording and/or reproduction head and the recording medium at the time of reproduction of the recording medium; and reversing relative movement direction between the recording medium and the recording and/or reproducing head to record the signal onto the recording medium by the recording and/or reproducing head, and further comprising a step of setting the total recording time based upon the recording time of the signal on the recording medium at the time of movement in the first direction and recording time of the signal onto the recording medium at the time of movement in the second direction, and making a setting such that the recording time of the first direction is longer than the recording time of the second direction.

9. A recording and/or reproducing method for a recording medium as set forth in claim 8, wherein recording time $T_{fwd}$ in the first direction is determined as:

$$T_{fwd} = (Vs-vp)/(2Vs-vm+Vs).$$

when standard relative movement velocity between the recording and/or reproducing head and the recording medium is Vs, error in a direction where the movement velocity is caused to be higher with respect to the standard relative movement velocity is vp, and error in a direction where the movement speed is caused to be lower with respect to the standard relative movement velocity is vm.

10. A recording and/or reproducing apparatus comprising:

drive means for relatively driving a recording and/or reproducing head and a recording medium in a first direction and in a second direction opposite to the first direction;

generating means generating high-speed retrieval designation information for carrying out an operation to retrieve a leading position of a recorded signal from a recording end position with respect to one movement direction of the relative first and second directions between the recording medium and the recording and/or reproducing head in correspondence with the other direction; and control means for recording the high-speed retrieval designation information generated by the generating means at the recording end position of the recording medium corresponding to any one direction of the first and second directions, and controlling the drive means on the basis of the high speed retrieval designation information recorded on the recording medium at the time of reproduction of the recording medium to start an operation to retrieve the leading position, wherein the control means records the high speed retrieval designation information generated by the generating means at the recording end position of the recording medium corresponding to the position in the second direction, and controls the drive means to switch a relative direction of the recording medium and the recording and/or reproducing head from the second direction to the first direction based on the high speed retrieval designation information recorded on the recording medium to continuously carry out an operation to retrieve the leading position.

11. A recording and/or reproducing apparatus comprising:

drive means for relatively driving a recording and/or reproducing head and a recording medium in a first direction and in a second direction opposite to the first direction;

generating means generating high speed retrieval designation information for carrying out an operation to retrieve a leading position of a recorded signal from a recording end position with respect to one movement direction of the relative first and second directions between the recording medium and the recording and/ or reproducing head in correspondence with the other direction; and control means for recording the high speed retrieval designation information generated by the generating means at the recording end position of the recording medium corresponding to any one direction of the first and second directions, and controlling the drive means on the basis of the high speed retrieval designation information recorded on the recording medium at the time of reproduction of the recording medium to start an operation to retrieve the leading position, wherein the control means further comprises retrieval means for retrieving the high speed retrieval designation information from the signal which has been read out by the recording and/or reproducing head, whereby the control means controls the drive means on the basis of a detection output from the detecting means to start an operation to retrieve the leading position.

12. A recording and/or reproducing apparatus for a recording medium as set forth in claim 11, wherein the control means controls the drive means to switch movement direction from one of direction of the first and second directions to the other direction at the recording end position of the recording medium to carry out the operation to retrieve the leading position.

13. A recording and/or reproducing method for a recording medium, wherein a recording and/or reproducing head and the recording medium are relatively driven in a first direction and in a second direction opposite to the first direction to record a signal on the recording medium, the method comprising the steps of:

recording high speed retrieval designation information for carrying out an operation to retrieve a leading position of the signal recorded from a recording end position with respect to one direction of the relative first and second directions between the recording medium and the recording and/or reproducing head in correspondence with the other direction at the recording end position of the recording medium corresponding to any one direction of the first and second directions, and starting an operation to retrieve the leading position on the basis of the high speed retrieval designation information recorded on the recording medium at the time of reproduction of the recording medium.

14. A recording and/or reproducing method for a recording medium as set forth in claim 13, wherein the method further comprises a step of recording the high speed retrieval designation information at recording end position of the recording medium when the recording medium and the recording and/or reproducing head are relatively moved in the second direction and switching the relative direction between the recording medium and the recording and/or reproducing head from the second direction to the first direction based on the high speed retrieval designation information recorded on the recording medium to continuously carry out an operation to retrieve the leading position.

15. A recording and/or reproducing method for a recording medium as set forth in claim 13, the method further comprising a step of setting a total recording time based on the recording time at the time of relative movement in the first direction between the recording and/or reproducing head and the recording medium and recording time at the time of relative movement in the second direction between the recording and/or reproducing head and the recording medium, and making a setting such that the recording time in the first direction is longer than the recording time in the second direction.

16. A recording and/or reproducing method as set forth in claim 15, wherein when a standard relative velocity between the recording and/or reproducing head and the recording medium is Vs, an error in a direction where the velocity is caused to be higher with respect to the standard relative velocity is vp, and an error in a direction where the velocity is caused to be lower with respect to the standard relative velocity is vm, the recording time $T_{fwd}$ in the first direction is determined as follows:

$$T_{fwd}=(Vs-vp)/(2Vs-vm+Vs).$$

17. A recording and/or reproducing apparatus for a recording medium, comprising:

drive means for relatively driving a recording and/or reproduction head and the recording medium in a first direction and in a second direction opposite to the first direction;

generating means for generating, at the time of recording a signal of the recording medium, and at the time point when substantially one half of total recording time is passed, reverse designation information for reversing a relative direction between the recording and/or reproducing head and the recording medium at the time of reproduction of the recording medium, and for generating high speed retrieval designation information for carrying out an operation to retrieve a leading position of the recorded signal, from recording a end position with respect to one direction of the relative first and second directions between the recording medium and the recording and/or reproducing head, in correspondence with the other direction, and control means operative to record the reverse designation information generated by the generating means at a recording end position of at least any one direction of the first and second directions of the recording medium by the recording and/or reproducing head to reverse the relative direction between the recording medium and the recording and/or reproducing head, and to control the drive means on the basis of the reverse designation information recorded on the recording medium to reverse direction from any one of the first and second directions of the recording medium to the other movement direction to record the high speed retrieval designation information generated by the generating means at the recording end position of the recording medium corresponding to any one of the first and second directions, and to control the drive means on the basis of the high speed retrieval designation information recorded on the recording medium at the time of reproduction of the recording medium to start an operation to retrieve the leading position.

18. A recording and/or reproducing apparatus for a recording medium as set forth in claim 17, the apparatus further comprising setting means for setting a total recording time on the basis of a recording time of the signal on the recording medium at the time of movement in the first direction and a recording time of the signal on the recording medium at the time of movement in the second direction, whereby the setting means makes a setting such that the recording time in the first direction is longer than the recording time in the second direction.

19. A recording and/or reproducing apparatus for a recording medium as set forth in claim 18, wherein the setting means determines the recording time $T_{fwd}$ in the first movement and direction as:

$$T_{fwd}=(Vs-vp)/(2Vs-vm+Vs)$$

when a standard relative velocity between the recording and/or reproducing head and the recording medium is Vs, an error in a direction where the velocity is caused to be higher with respect to the standard relative velocity is vp, and an error in a direction where the velocity is caused to be lower with respect to the standard relative velocity is vm.

20. A recording and/or reproducing apparatus for a recording medium as set forth in claim 17, wherein the apparatus further comprises memory means for storing a signal recorded on the recording medium, whereby the signal recorded onto the recording medium is temporarily stored in the memory means when the drive means is controlled by the control means to switch from one direction of the first and second directions of the recording medium to the other direction.

21. A recording and/or reproducing apparatus for a recording medium as set forth in claim 17, the control means further comprises first detecting means for detecting the reverse designation information from the signal read from the recording medium by the recording and/or reproducing head, and second detecting means for detecting the high speed retrieval designation information from the signal generated from the recording medium by the recording and/or reproducing head.

* * * * *